Patented Aug. 12, 1924.

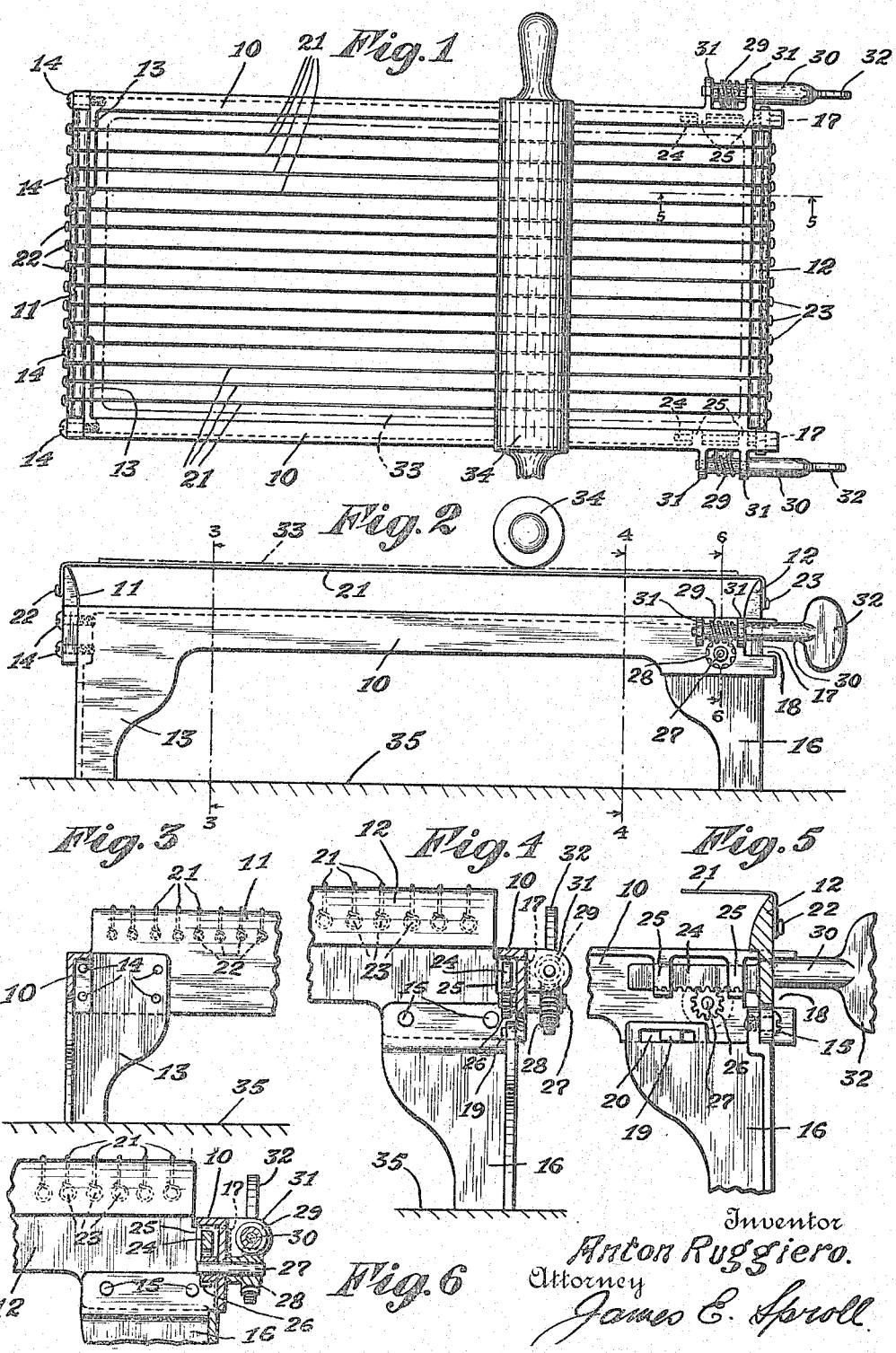

1,504,383

UNITED STATES PATENT OFFICE.

ANTON RUGGIERO, OF SEATTLE, WASHINGTON.

NOODLE-FORMING MACHINE.

Application filed January 25, 1922. Serial No. 531,577.

*To all whom it may concern:*

Be it known that I, ANTON RUGGIERO, a subject of the King of Italy, residing at Seattle, in the county of King and State of Washington, have invented a certain new and useful Improvement in Noodle-Forming Machines, of which the following is a specification.

My invention relates to improvements in noodle forming or cutting machines and the primary object of my invention is to provide a noodle forming machine adapted to form or cut a plurality of noodles of uniform width from a sheet of rolled dough in a single operation.

Another object is to provide a noodle forming machine embodying interchangeable cutting means, whereby noodles of any desired width may be obtained.

A further object is to provide a noodle forming machine embodying novel adjusting means adapted to regulate the tension of the cutting means of said machine.

A still further object is to provide a noodle forming machine embodying a plurality of spaced longitudinally disposed cutting elements.

A still further object is to provide a noodle forming machine embodying simplicity, durability and economy in construction, that is positive and efficient in operation and that will not readily get out of order.

With the above and other more specific objects in view which will appear as the description proceeds my invention resides in the novel construction, combination, adaptation and arrangement of parts hereinafter described and claimed.

I accomplish these objects by devices illustrated in the accompanying drawings, wherein:—

Figure 1 is a top plan view of a noodle forming machine fabricated in accordance with my invention.

Fig. 2 is a view in side elevation thereof.

Fig. 3 is a fragmentary view in transverse section taken on a broken line 3—3 of Fig. 2.

Fig. 4 is a similar view in similar section taken on a broken line 4—4 of Fig. 2.

Fig. 5 is a similar view in longitudinal section taken on a broken line 5—5 of Fig. 1, and Fig. 6 is a similar view in transverse section taken on a broken line 6—6 of Fig. 2.

Referring to the drawings throughout which like reference numerals designate like parts, the numeral 10 designates the longitudinally disposed, angularly formed side members of the machine frame, which are normally maintained in spaced parallel relation by intervening transversely disposed removably secured end members 11 and 12 respectively.

Integral with or otherwise fixedly secured to the rear ends of the side members 10 are downwardly extending angular legs 13, which legs are adapted to support the rear end of the machine frame.

The end member 11 is adapted to be removably secured at the ends thereof, as by screws 14, to the rear ends of the side members 10 and to extend upwardly therefrom above the plane of the upper face of said side members substantially in the manner illustrated.

The end member 12 is adapted to be removably secured at the ends thereof, as by screws 15, to the upper outer ends of downwardly extending angular legs 16, which member 12 and legs 16 are interposed for longitudinal adjustment or movement between the forward ends of the side members 10. Said end member 12 is also adapted to extend above the plane of the upper face of said side members substantially as shown.

To properly guide the end member 12 for longitudinal movement between the forward ends of the side members 10 I have provided the ends of the said end members with outwardly projecting lugs 17, which lugs are normally disposed within guideways 18 formed within the vertical walls of the said forward ends of the said side members, and to similarly guide the angular legs 16 during said longitudinal movement, I have provided the inner sides of the said vertical walls of said side members adjacent the forward ends thereof with inwardly projecting integral studs 19, which studs are normally disposed within slots 20 formed within the upper inner ends of the said angular legs 16.

The noodle forming or cutting means comprises a plurality of longitudinally disposed spaced parallel wires 21, which wires are adapted to be fixedly secured in any well known manner at the rear ends thereof to spaced integral stub pins 22 formed upon the outer face of the end member 11 and to be similarly secured to spaced integral stub pins 23 formed upon the outer face of the end member 12.

To regulate and maintain the proper and desired tension for the cutting wires 20, I have provided the lugs 17 of the end member 12 with inwardly projecting racks 24, which racks are adapted to be guided within integral guideways 25 formed upon the inner faces of the side members 10 adjacent the forward end thereof.

Meshing with the racks 24 are pinions 26, which pinions are fixedly secured to the inner ends of shafts 27 journalled for rotation within the vertical side walls of the side members 10, said shafts are adapted to project outwardly from the said side members 10 and to fixedly receive upon the outer ends thereof worm wheels 28.

Meshing with the worm wheels 28 are worms 29, which worms are adapted to be fixedly secured to the inner ends of actuating stems 30, which inner ends are adapted to be journalled for rotation within outwardly projecting, spaced integral lugs 31, formed upon the outer faces of the side members 10.

The actuating stems 30 are adapted to extend forwardly from the lugs 31 and are provided upon their outer ends with flattened portions 32, to thereby facilitate the manipulation of the said actuating stems.

It will therefore be apparent from the foregoing that by manipulating the stems 30 that the desired tension upon the wires 21 may readily and quickly be obtained.

While I have shown the cutting means in the form of wires, I desire to have it understood that relative thin narrow metallic strips disposed in edgewise relation may be utilized to form the cutting means of the machine.

In practice I have found it desirable to removably secure the end members 11 and 12 in the manner illustrated, so that the latter may be readily detached and replaced by end members having a greater or lesser number of cutting wires 20, to thereby obtain noodles or strips of any desired or selected width.

In the operation of my device a sheet of prepared dough, as 33, indicated in dot and dash lines in Figs. 1 and 2, is superimposed upon the wires 20 and a rolling pin, as 34, rolled upon said sheet with the requisite pressure, to thereby cut the same into noodles or strips, which noodles when thus cut will drop upon the table or supporting surface 35, as will be readily apparent, this operation is repeated till the required quantity of noodles is obtained.

From the foregoing description taken in connection with the accompanying drawings, the advantages of construction and method of operation of my noodle forming machine will be readily apparent to those skilled in the art to which my invention pertains, but while I have shown and described the construction and operation of a noodle forming machine, embodying my invention, which I now consider to be the best embodiment thereof, I desire to have it understood that the device shown is merely illustrative and that such changes may be made when desired as are within the scope of my invention and embodied in the accompanying claims.

What I claim is:—

1. In a noodle forming machine, in combination, a rectangular frame comprising spaced parallel side members having supporting integral legs formed upon the rear ends thereof, an interchangeable transverse bar detachably secured upon the rear ends of said side members and having the upper edge thereof disposed in a plane above said side members, an interchangeable transverse bar detachably and adjustably mounted upon the forward ends of said side members having the upper edge thereof disposed substantially in the plane of the upper edge of said first named transverse bar, supporting legs detachably secured upon said adjustably mounted transverse bar, a plurality of longitudinally disposed parallel cutting strands fixedly secured at the individual ends thereof to said transverse bars in spaced relation thereon, and manually operable mechanisms interposed between the forward ends of said side members and the ends of said adjustably mounted transverse bar adapted to regulate the tension of said cutting strands.

2. In a noodle forming machine, in combination, a frame comprising side members disposed in spaced parallel relation having supporting integral legs formed upon one end thereof and having slotted guideways formed within the opposite end thereof, a detachably secured transverse bar disposed upon the said first named end, an adjustably mounted transverse bar disposed upon the said opposite end having the ends thereof disposed within said guideways, supporting legs removably secured upon said adjustably mounted transverse bar adapted to be guided for longitudinal sliding movement upon the inner faces of said side members, a plurality of cutting strands adapted to be secured at the ends thereof to said transverse bars, inwardly projecting integral rack portions on said adjustably mounted bar adapted to be slidably mounted upon the inner faces of said side members, shafts journalled in said side members, pinions rigidly secured upon the inner ends of said shafts adapted to mesh with said racks, worm wheels rigidly secured upon the outer ends of said shafts, worms meshing with said worm wheels, and manually operable stems rotatively mounted upon the outer faces of said side members adapted to be rigidly secured to said worms and to regulate the tension of said cutting strands.

In witness whereof, I hereunto subscribe my name this 16th day of January, A. D. 1922.

ANTON RUGGIERO.